United States Patent [19]

Campbell et al.

[11] 4,397,970
[45] Aug. 9, 1983

[54] PROCESS FOR EPOXY PHOSPHATE COATING RESINS

[75] Inventors: Kent D. Campbell, Concord, Calif.; Horst G. Langer, Wayland, Mass.; Patrick H. Martin, Danville, Calif.

[73] Assignee: The Dow Chemical Company, Midland, Mich.

[21] Appl. No.: 321,347

[22] Filed: Nov. 13, 1981

Related U.S. Application Data

[63] Continuation-in-part of Ser. No. 276,864, Jun. 24, 1981, abandoned.

[51] Int. Cl.$^3$ .......................... C08L 63/00; C08K 5/05
[52] U.S. Cl. ...................................... 523/402; 428/35; 523/403; 523/416; 525/524; 528/108
[58] Field of Search ............... 523/402, 404, 414, 403; 528/108; 525/524; 428/35

[56] References Cited

U.S. PATENT DOCUMENTS

| | | | |
|---|---|---|---|
| 2,541,027 | 2/1951 | Bradley | 106/14.41 |
| 3,245,940 | 4/1966 | Ronay et al. | 260/30.6 |
| 4,059,550 | 11/1977 | Shimp | 523/404 |
| 4,164,487 | 8/1979 | Martin | 523/402 |
| 4,289,812 | 9/1981 | Martin | 523/402 |

Primary Examiner—Theodore E. Pertilla

[57] ABSTRACT

The invention is an improved process for preparing epoxy resin/phosphoric acid reaction products having high enough phosphomonoester contents to be water-dispersible (as base salts) and low enough free acid contents to yield water-resistant cured coatings. The phosphoric acid is provided as an acid source material deriveable by the reaction of a hydroxylic P—OH functionality-limiting agent (blocking agent) with phosphoric anhydride as such or as a reaction product thereof with less than six molecular proportions of water. A resin solvent, which may also function as the P—OH blocking agent but otherwise is inert and acceptable as part of the final coating resin formulation, is employed as the reaction medium. The epoxide/acid reaction is allowed to proceed, effectively in the absence of water, until the content in the reaction mixture of species indistinguishable from $H_3PO_4$ by base-titration has dropped to a minimum. Then enough water to hydrolyze the phosphopolyesters present is added and the hydrolysis is carried out, thereby cleaving the ester groups formed from the blocking agent and generating the P—OH groups needed for salification. The disclosed resin compositions are of particular utility for coating the interiors of beverage cans.

22 Claims, No Drawings

PROCESS FOR EPOXY PHOSPHATE COATING RESINS

CROSS-REFERENCE TO RELATED APPLICATION

The present application is a continuation-in-part of a co-pending application, Ser. No. 276,864, filed June 24, 1981.

BACKGROUND OF THE INVENTION

The preparation of epoxy resin/H$_3$PO$_4$ reaction products which—when amine-salified—have utility as water-borne film-forming materials is disclosed in U.S. patent application Ser. No. 19,958, filed Mar. 12, 1979 in the name of Patrick H. Martin as inventor, and now issued as U.S. Pat. No. 4,289,812. (The disclosure of said patent is incorporated herein, by reference, for all purposes which thereby may be legally served.)

In the preferred version of the disclosed process, about 1 phr of H$_3$PO$_4$, is reacted, in the form of the 85% acid (~0.2 phr H$_2$O) for about 4 hours with a nominally difunctional epoxy resin which is a copolymer of bisphenol A with its diglycidyl ether and has an EEW (epoxide equivalent weight) of about 1500-2000. The reaction is carried out in a relatively hydrophobic solvent for the resin, such as an acetone/CH$_2$Cl$_2$ mixture, which does not strongly solvate the acid or water and results in the formation of phosphate ester groups comprising from one to three epoxide residues each. This is accompanied by hydrolysis of higher ester to monoester groups and concurrent formation of terminal glycol groups on the cleaved-off resin molecules. Acid catalyzed, direct hydrolysis of oxirane groups (to glycol groups) also occurs to a limited extent.

The reaction mixture is mixed with water, triethylamine added in excess and the solvent and unsalified amine stripped off to yield an aqueous dispersion of the amine-salified product resin having a solids content of about 50 wt. %.

For efficient operation of the foregoing process on a plant scale, it must be carried out in a continuous manner and the recovered solvents and amine separated and recycled. This necessarily requires a relatively complicated plant installation incorporating separate vessel, pump, line and control instrument assemblies for each of several stages, i.e., reaction, water and amine addition, stripping and separation stages. It is thus evident that a simpler process, requiring a less complicated and costly plant installation, would be highly desirable. Also, a reduction in the reaction time would be desirable.

For the presently most important contemplated application of the coating resins made in the foregoing manner—i.e., as sprayed-on, beverage can interior coatings—the aqueous resin dispersion is formulated with certain "coupling" solvents, such as n-butanol, glycol monoethers, etc., which are high boiling but readily volatilized at the temperatures required (with curing agents such as melamine resins, for example) to cure the coatings. Examples 11, 18 and 20 in the above-referred-to application disclose such formulations comprising glycol monoethers and said application also teaches that glycol ethers are suitable media for the epoxide/phosphoric acid reaction ("adduction"). Also, U.S. Pat. No. 4,059,550 (Shimp) discloses the use of the monobutyl ethers of ethylene and diethylene glycols as media for such adductions and the use of the resulting solutions (including an organic base) as catalysts in multi-component resin systems.

Thus, the possibility of eliminating the need for solvent removal from the reaction mixture formed in the above-described process, by utilizing a formulation solvent as the reaction medium, was considered—an implicit assumption being that the amount of solvent required would not be such as to result in an unacceptably high solvent-to-water or solvent-to-solids ratio for the contemplated application. That is, because the solvent would not be removed, a high enough solids content must be attainable in the reaction mixture so that the solids level after dilution with water and any other solvents in the final formulation will still be adequate for the requisite mode of application and the essential film-forming properties of the coating formulation. Also, the content of volatilizeable organic components (VOC) in the final formulation would have to be low enough not to result in an unacceptable level of emissions in the curing step. The matter of reaction mixture viscosity at adequately high solids levels is also of concern (with regard to stirring power requirements).

The monobutyl ether of ethylene glycol (DOWANOL-EB; or simply "EB" hereinafter) was tried as the medium for reactions of 1 phr of H$_3$PO$_4$ (as 85% aq. H$_3$PO$_4$) with an epoxy resin (D.E.R.-667) represented by the following ideal formula, n having a value therein of from about 12 to 14, R$_1$ being H and Q being the nucleus of bisphenol A:

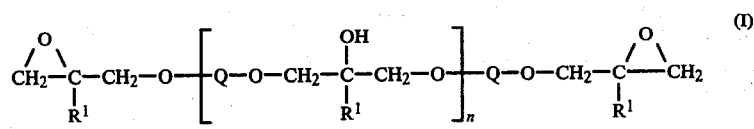

The reactions were carried out under the conditions known to be suitable when acetone/CH$_2$Cl$_2$ is employed as the reaction medium. The free H$_3$PO$_4$ content of the reaction product was found to be low enough for applications not posing stringent water-resistance requirements but undesirably high for can coatings to be subjected to conditions commonly employed for pasturization. Correspondingly lower phosphomonoester contents were also experienced. These results were believed due to greater retardation of the adduction reaction than of the hydrolysis reactions, as a consequence of differences in (acid and water) solvation effects by the hydrophilic reaction medium employed.

This was despite the fact that the solvent only constituted about 40 wt. % of the initial reaction mixture (60% "solids" or non-volatiles).

At this point, the use of an anhydrous form (100% or higher) of phosphoric acid, which is taught as an operable option in the above-referred-to application, was considered, as this would permit the adduction (phosphorylation) to be carried out in the absence of water. However, the only example (#10) in said application of using such an acid source material (pyrophosphoric acid) discloses that gelling of the reaction mass occurred, requiring excessive dilution with more of the solvent (dioxane) in order to have a stirrable mixture, which is essential to usefully rapid, subsequent hydrolysis of phosphopolyesters (and any residual P—O—P groups).

The rapid development of a very high viscosity observed in the absence of concurrent hydrolysis is believed attributable primarily to formation of esters by adduction of two or three oxiranes per P=O moiety, which occurs even if 100% $H_3PO_4$ (essentially no P—O—P groups) is used as the acid.

U.S. Pat. No. 2,541,027 (Bradley) discloses monoalkylorthophosphates as an alternative to the use of $H_3PO_4$ in preparing adducts with epoxy resins. This was considered as a way of attaining some reduction in the number of long-chain branches per phosphopolyester group, thereby reducing the viscosity of the reaction mixture. However, this would also result in introduction of not necessarily desirable or readily hydrolyzed alkyl groups in the product resin. Furthermore, it was not apparent that excessive amounts of solvent would not still be required.

Consideration was also given to the use of dialkyl orthophosphates as the acid, but this would result in triesters containing *two* alkyl groups not necessarily desirable or more readily hydrolyzed than the ≧ PO—OC— group formed by P—OH/oxirane adduction—thus posing the problem of whether the PO—OH required for salification could be formed without cleavage of the latter PO—OC group. A substantial reduction in the adduction rate would also be anticipated, at a given P/oxirane reactant ratio.

The prior art itself does not contemplate a "one-pot" process or address itself to the problems inherent in attempting to use a formulation solvent as the reaction medium for preparing $H_3PO_4$/epoxide adducts of high phosphomonoester contents and low free acid contents. Neither does it make obvious a solution to those problems. However, the process of the present invention, as defined in the following summary, does provide such a solution.

OBJECTS OF THE INVENTION

The primary object of the invention is to provide a simpler, faster and more economical method of preparing aqueous coating compositions in which (1) the principal film-forming component consists of amine-salified, phosphomonoesters deriveable from a polyhydroxy polyether epoxide, orthophosphoric acid and water and (2) the free acid content is low enough so that the cured coating will be water-resistant.

An ancillary object is to provide such a method wherein epoxide/P—OH adduction can be carried out essentially in the absence of water and at a high solids level without the reaction mixture gelling or becoming excessively viscous, and hydrolysis of the resulting phospho di- and triesters to said monoesters can then be carried out in situ.

Another object is to maximize the proportion of the phosphorus present in the coating composition in the form of epoxide-deriveable monoester groups.

A further object is to provide such a method in which the reaction medium does not have to be removed and may be included in the final coating composition.

An additional object is to provide such a method in which less amine is required to achieve adequate resin dispersibility in water and amine removal from the salified reaction mixture is unnecessary.

Still other objects will be made apparent to those knowledgeable in the art by the following specification and claims.

SUMMARY OF THE INVENTION

The invention is an improved process for preparing epoxy resin/phosphoric acid reaction products having high enough phosphomonoester contents to be water-dispersible (as base salts) and low enough free acid contents to yield water-resistant cured coatings. The phosphoric acid is provided as an acid source material deriveable by the reaction of a hydroxylic P—OH functionality-limiting agent (blocking agent) with phosphoric anhydride as such or as a reaction product thereof with less than six molecular proportions of water. A resin solvent, which may also function as the P—OH blocking agent but otherwise is inert and acceptable as part of the final coating resin formulation, is employed as the reaction medium. The epoxide/acid reaction is allowed to proceed, effectively in the absence of water, until the content in the reaction mixture of species indistinguishable from $H_3PO_4$ by base-titration has dropped to a minimum. Then enough water to hydrolyze the phosphopolyesters present is added and the hydrolysis is carried out, thereby cleaving the ester groups formed from the blocking agent and generating the P—OH groups needed for salification.

By this method, the foregoing objects are realized. Also, the product can be salified and diluted with water in situ.

The above materials and procedures are essential to a "one-pot" mode of operation but the advantages of the process are not otherwise limited to that mode of practicing the invention.

More precisely, the present invention may be defined as an improvement in the process of preparing aqueous coating compositions wherein a polyol polyether epoxide is reacted with a phosphoric acid source material and water in a reaction medium, the reaction mixture is salified with a base and diluted with water and the reaction medium removed from it, said improvement comprising:

(1) employing as said acid source material one deriveable by the reaction of a hydroxylic, (P—OH)-blocking agent with (a), $P_4O_{10}$, (b), a reaction product of $P_4O_{10}$ with less than six molecular proportions of water, or (c), an adduct of (b) with some of the oxirane groups in said epoxide, (2) employing as said medium a hydrophilic solvent for said epoxide which is acceptable as a component of said coating composition, (3) phosphorylating said epoxide by reacting P—OH groups in the acid source material—effectively in the absence of free water molecules—with oxirane groups in said epoxide until the content in the reaction mixture of free $H_3PO_4$ drops to a preselected level and then (4) subjecting the resultant reaction product to hydrolysis until the content in the reaction mixture of oxirane-derived phosphomonoester groups rises to at least a preselected value, and (5) omitting removal of the reaction medium.

DEFINITIONS OF TERMS

It is not to be inferred that the acid source material must actually be derived by reaction of $P_4O_{10}$ with water and/or the blocking agent. It is only necessary that the acid source material be at least theoretically so preparable. Acid source materials which meet this requirement but have actually been made from other reactants are not ruled out.

The term "effectively in the absence of free water molecules" is not intended to exclude the small amounts (a total of up to about 0.5% in some instances) of water frequently present in the epoxide resins and those commercial solvents which may be employed as blocking agents or reaction media. However, it does emphasize the desirability of water contents approaching zero (a practical impossibility).

The reaction medium may also function as the P—OH blocking agent and does not necessarily have to be water-miscible in order to be acceptable as a component of the coating composition.

The formula $P_4O_{10}$ is intended to denote the actual composition of phosphoric anhydride, commonly referred to as "phosphorous pentoxide" and loosely represented as $P_2O_5$.

The term "free $H_3PO_4$" includes other phosphorous acid species indistinguishable from $H_3PO_4$ by titration, such as

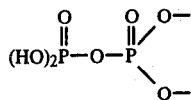

group-comprising acids present as the result of equilibration between P—O—P-consuming and -forming reactions with water and the blocking agent.

DETAILED DESCRIPTION

Suitable epoxides for the practice of the present invention include polyol, polyether epoxides which can be represented by either of the following formulas I and II:

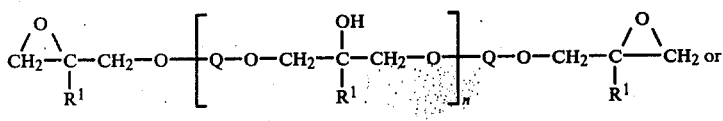

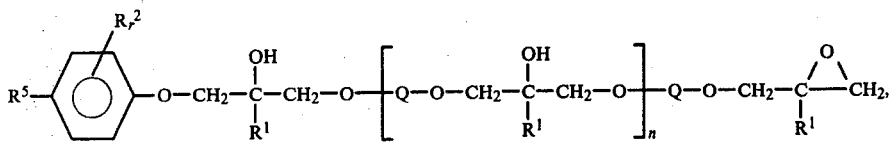

wherein
Q, independently, in each occurrence, is

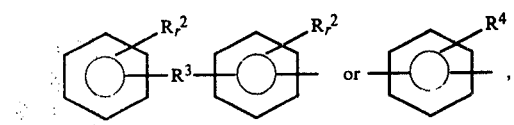

n is an integer of from 0 to 40, r is zero, 1 or 2 and, independently in each occurrence;
$R^1$ is H, methyl or ethyl,
$R^2$ is —Br, —Cl or a $C_1$ to $C_4$ alkyl or alkenyl group,
$R^3$ is a $C_1$-$C_4$ alkylene or alkenylene group, >C(CF_3)_2, —CO—, —SO_2—, —S—, —O— or a valence bond,
$R^4$ is —Br, —Cl or a $C_1$ to $C_4$ alkyl or alkenyl group; and
$R^5$ is H or alkyl of 1 to 12 carbons.

The most preferred epoxides are those of formula I wherein n is from about 12 to about 14, Q is a bisphenol A residue and $R^1$ is H.

Suitable phosphoric acid source materials are those derivable by the reaction of the hydroxylic blocking agent with either $P_4O_{10}$ as such or with reaction products of $P_4O_{10}$ with less than 6 molecular proportions of water. That is, if the blocking agent is to be reacted with a pre-formed hydrate of $P_4O_{10}$, that hydrate must be a partial hydrate, i.e., a "condensed" orthophosphoric acid having an acid "content" greater than 100%. In other words, P—O—P groups must be available to react with the hydroxyl group in the blocking agent. (EB, for example, exhibits essentially no reactivity with P—OH groups under comparable conditions.)

It is believed that suitable acid source materials can also be formed by first reacting the P—OH groups in the condensed acid with oxiranes in some of the epoxide molecules and then introducing the blocking agent to react out the P—O—P groups in the adducts. This presumes that the solvent in which the epoxide is dissolved is itself not reactive with P—O—P groups and depends on the use of an amount of the acid which provides a relatively low ratio of P—OH to oxiranes. Even then, this reaction sequence is considered likely to result in gelling unless a low molecular weight epoxide is used and the percent solids is as low as is acceptable (on the basis of other considerations).

When water is to be incorporated in the acid source material, this can be done by reacting $P_4O_{10}$ first with less than 6 molecular proportions of water and then with the blocking agent hydroxyls, or vice versa. In the latter case, however, either the number of hydroxyls provided by the blocking agent must be less than six per $P_4O_{10}$ or the amount of water supplied must be limited to that which can be essentially completely consumed by hydrolysis of the phosphotriesters (produced in the initial reaction) to phosphodiesters. That is, the presence of free molecules of either water or $H_3PO_4$ (other than in equilibrium amounts) is to be avoided, at least in effect.

The acid source material may be pre-formed, i.e., in the absence of the epoxy resin, or may be formed in situ, i.e., in the presence of the resin. When the reaction medium (or a component thereof) also functions as the blocking agent, it is particularly convenient to take the latter tack; that is, to add $P_4O_{10}$ (or a partial hydrate thereof) to a pre-formed solution of the resin in the reaction medium. (Contrary to what was feared, it was found that this did not result in homopolymerization of the epoxide to any substantial extent. However, in situ formation of the acid source material requires more intense agitation upon scale-up of the reaction, in order to avoid the presence of P—O—P group-containing acid materials when the hydrolysis step is initiated.

Also, higher temperatures may be necessary in order to hold down the viscosity of the reaction mixture, due to a phosphopolyester content in the reaction mixture.) In batch type operation, the acid source material may be pre-formed by reaction of the acid and blocking agent in at least a limited amount of the reaction medium, in the phosphorylation kettle, before any balance of the medium and the epoxy resin are added (separately or as a pre-formed solution).

It is to be noted that in-situ reaction of the blocking agent with P—O—P groups—even when the latter are provided as $P_4O_{10}$—does not preclude conversion of a substantial proportion of the epoxide oxirane groups to phosphopolyesters comprising more than one epoxide residue (by oxirane/P—OH reaction). However, the present invention is not bottomed on complete avoidance of this and it is only necessary to reduce the formation of such esters to an extent such that practicably low reaction mixture viscosities, satisfactorily low free acid contents and adequately high epoxide-derived phosphomonoester contents are achieved.

It is also to be noted that reaction of the blocking agent hydroxyls with P—O—P groups in a phosphoester derived by reaction of P—OH's (in a condensed phosphoric acid) with oxirane groups in the epoxide is believed to occur to a limited extent during in-situ formation of the acid source material but this—in effect—is the same as the reverse ("normal") sequence of the two reactions, i.e., blocking agent/P—O—P reaction followed by P—OH/oxirane reaction.

Any of the condensed forms of orthophosphoric acid, such as pyrophosphoric (110%) acid, metaphosphoric acid, polyphosphoric (115%) acid, etc., may be reacted—as such or as adducts (through their P—OH groups) with oxiranes present in the epoxide—with the blocking agent to form the acid source material. The choice among these may vary, according to their solubility behaviors with the particular reaction medium to be employed. However, liquid forms of the condensed acid, such as polyphosphoric and "super" (105%) phosphoric acids are more easily handled without exposure to moisture and are generally more readily dissolved.

Preparation of the acid source material by equilibration of $P_4O_{10}$ with only enough blocking agent to supply 4 —C—OH's results in a product which consists essentially of pyrophosphates, i.e., of $(RO)_2$-PO—O—PO(OH)$_2$ and (the statistically more favored species)

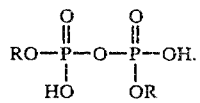

This is advantageous in that the equilibrium content of water-scavenging P—O—P groups will be higher and initiation of the reaction under essentially anhydrous conditions will be facilitated.

When at least six blocking agent hydroxyls are provided for each $P_4O_{10}$ molecule, formation of free $H_3PO_4$ (and a phosphotriester) is not favored and essentially every P=O group in the equilibrium product will be linked to at least one each of —OH and OR groups (R—OH being the blocking agent). That is, the product will consist predominantly of HO—PO(OR)$_2$ and (HO)$_2$PO(OR), although a small amount of each of P—O—P group-containing species and $H_3PO_4$ will be present too.

If not every P—O—P group in the $P_4O_{10}$ is reacted out (with the blocking agent and water), not every phosphorous atom in the resulting acid source material will have at least one acid hydroxyl attached to it. The proportion of the $P_4O_{10}$ reporting in the esterification product as oxirane-derived ester groups will be lower and the content of free acid in the hydrolyzed end-product will be higher. (However, even with an excess of the blocking agent present, conversion of the last P—O—P groups prior to reaching an equilibrium proceeds slowly.)

As a general rule, the higher the proportion of P—O—P groups (in $P_4O_{10}$) reacted out with the blocking agent, rather than water, in forming the acid source material, the lower the content of free $H_3PO_4$ will be in the hydrolyzed product. Also, the content of phosphoester groups derived from more than one epoxide molecule will be lower, which is advantageous in that it results in a lower maximum viscosity for the unhydrolyzed reaction mixture.

Another method of preparing a suitable acid source material is to first react an alkylene oxide with $P_4O_{10}$, in the manner taught in U.S. Pat. No. 3,597,511— thereby forming a bis-alkylenepyrophosphate comprising the moiety

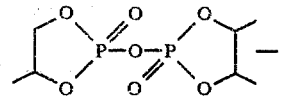

and then carefully hydrolyzing the P—O—P group as taught in U.S. Pat. No. 3,652,743. In this manner, cyclic phosphodiesters ("ring acids") of the formula

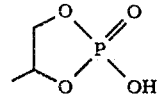

which are suitable as the acid source material, can be prepared essentially free of monoesters. It will be recognized that the foregoing pyrophosphate precursors of such ring acids are theoretically derivable by direct esterification of a 1,2-glycol (the blocking agent) with pyrophosphoric acid, and the ring acids therefore are within the ambit of the preceding acid source material definition, even though not actually prepared from a C—OH group-comprising compound.

"Ring acids" comprising 6-membered rings, such as

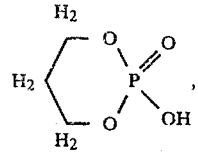

can similarly be prepared from the corresponding bis-pyrophosphates (made as per U.S. Pat. No. 3,159,591). These acid source materials illustrate the suitability of 1,3-diols as blocking agents.

Suitable blocking agents are those —C—OH (hydroxylic) compounds which are capable of forming phosphoester groups more readily hydrolyzed than the epoxide-derived phosphomonoester groups or which are not readily evolved during curing and are acceptable in the final product. (Of course, if the blocking agent-derived ester groups are not readily hydrolyzed, care must be taken to ensure that the $P_4O_{10}$ is not fully esterified by the blocking agent, i.e., provision for the P—OH groups essential to both oxirane adduction and product salification must be made.) It is presently considered highly preferable that the blocking agent-derived ester groups be readily hydrolyzed, particularly when the reaction medium also functions as the blocking agent. That is, in the latter case, the molecules of reaction medium "consumed" in forming the acid source material are regenerated during the post-adductin hydrolysis step.

EB is particularly suitable as the blocking agent because the phosphate ester groups formed from it are quite readily hydrolyzed (more so than those derived from n-butanol, for example), i.e., more readily "unblocked"—after the epoxide has been phosphorylated.

When at least one of the ester groups in a phosphodiester is readily hydrolyzeable and the hydroxylic compound thereby (re)generated is acceptable in the final resin composition, that diester may function as an acid source material in the process of the present invention. Ordinarily, however, it will not be practical to employ a pre-formed phosphodiester separate from the monoester(s) (and other species) which form when the corresponding hydroxylic compound(s) is (are) reacted with a condensed phosphoric acid.

It will be apparent that the acid source material may comprise ester groups derived from more than one hydroxylic compound (blocking agent). Thus, a condensed phosphoacid containing a

group or two P—O—P groups may be reacted first with one molecular proportion of a first alcohol (R—OH) and then with a different alcohol (R'—OH). In this manner, at least a substantial fraction of the esters formed may be expected to be mixed diesters such as HO—PO(OR)(OR'). Similarly, a P—O—P-containing compound may simply be reacted with a mixture of two comparably reactive hydroxylic compounds.

Specific types of hydroxylic compounds suitable for use as the blocking agent include alcohols, phenols, glycols and glycolmonoethers. It is believed that carbonyl compounds, such as acetonylacetone, for example, which are readily enolized under acidic conditions may also play the role of blocking agents—at least when pre-reacted with a condensed phosphoacid in solvents (toluene or dioxane, for example) which are essentially non-polar and therefore tend to shift the keto-enol equilibrium strongly toward the enolic form. The presence of two or more hydroxyls on the same molecule is not considered necessarily detrimental and may even be advantageous (ethylene glycol, for example, is relatively high boiling and is water-miscible).

The presently most preferred blocking agents are glycol monoethers, by reason of the fact that they not only are high boiling and are good (preferred, in fact) reaction media but also form readily hydrolyzed phosphoester groups (by reaction with P—O—P groups; not with >PO(OH) groups). The monobutyl ether of ethylene glycol ("EB", an established coupling solvent) is particularly preferred as a reaction medium having easily reversed blocking capability.

$C_4$ and higher aliphatic alcohols—both linear and branched—have been found suitable as blocking agents for coatings applications. The branched alcohols tend to result in higher makes of hydrolysis-resistant triesters and, though fully operable, are accordingly less preferred. n-Butanol (another acceptable resin dispersion component) tends to yield a higher content of triesters in the adduction stage of the process but these esters are not highly resistant to hydrolysis. Phenol yields a final (hydrolysis) product which more readily takes up water but also contains more free acid. Benzyl alcohol and phenethyl alcohol have not been used but are considered suitable.

Suitable reaction media are those solvents which meet the following specifications. That is, to be suitable, the solvent:

(1) must be acceptable as a component of the final resin formulation to be employed for a given application, (2) must be capable of dissolving (or at least dispersing) the epoxy resin, (3) must be of such a nature that the solution or dispersion of the epoxide in it is capable of dissolving, or at least dispersing, the acid source material (or the precursors thereof, if formed in situ), (4) must not solvate the epoxide or acid source material in such a manner as to retard the adduction to an intolerable degree, (5) must be chemically inert, i.e., must not detrimentally react with any component of the reaction mixture to an intolerable degree, (6) must dissolve or maintain dispersed both the epoxide/acid reaction product and water, without solvating either in such manner as to retard the hydrolysis reaction to an intolerable degree, and (7) if it is to also serve as the blocking agent, must form phosphoester groups more readily hydrolyzed than phosphomonoester groups formed by P—OH/oxirane adduction.

Preferably, the solvent is capable of dissolving the starting epoxide, the acid source material (or its precursors), the epoxide/acid reaction product, water and the amine employed for salification.

It is also essential that the phr of solvent (parts of solvent per hundred parts of resin) which must be used in order to avoid excessive power requirements for agitation of the reaction mixture is not such as to result in an inacceptably high solvent content in the final product formulation.

Although highly preferred, it is not essential that the reaction medium be water-miscible. That is, the solvent may be acceptable as a component of the final formulations, even though it is not water-miscible. However, it should at least be hydrophillic enough to permit the hydrolysis step to proceed at a practicable rate.

Not very many solvents (or solvent mixtures) capable of dissolving epoxy resins having molecular weights of from about 900 to about 2900 are presently known. Not all of those which are known are formulation acceptable. Of those which are acceptable, not all are capable of forming solutions in which the resin ("solids") content are as high or even 25 percent (by weight). Yet, in order to meet current VOC limitations, and for other reasons discussed earlier herein (Background), it is essential—at least for coatings applications—to be able to use substantially less solvent than the amount (300 phr) corresponding to a 25 wt. % resin content.

It has been found that total solids (resin+non-volatiles) contents of up to about 85 wt. % in the hydrolyzed reaction mixture can be attained using EB as the reaction medium (and blocking agent). It is known that other glycol monoethers, such as lower alkyl ethers of ethylene glycol and diethylene glycol are capable of forming epoxyresin solutions containing at least 50% by weight of the resin. Exemplary solvents of this type which have been found suitable as reaction media in the present process are the monomethyl ether of propyleneglycol (DOWANOL*-PM, i.e., "PM") and 1-isobutoxy-2-propanol (DOWANOL*-PiBT, or "PiBt")
(*trademark of The Dow Chemical Company).

The free acid content of the hydrolyzed P—OH/oxirane adducts made in the latter solvent tends to be lower but PiBT is not, by itself, a satisfactory coupling solvent in all types of formulations and is so hydrophobic that—in certain formulations—it effects the viscosity of the aqueous dispersion as though it were an organic solute, rather than a solvent, therein; that is, it imparts a higher "viscosity response" upon dilution of the salified hydrolysis mixture (in combination with one or more coupling solvents) with water. PM is a good coupling solvent but is less of a problem in the latter regard; its use results in somewhat higher free acid contents. Although use of EB results in still higher acid contents, it is an excellent coupling solvent and the acid content will be acceptable ($<1.5\times10^{-2}$ millimoles per gram of solids, for can-lining applications, for example) if an acid source material of the type specified for the present process is employed and water is essentially excluded from the reaction mixture until the free acid content therein has bottomed out (at which time water is added to initiate hydrolysis).

Other specific epoxy resin solvents considered operable (alone or in solvent mixtures) as reaction media are dioxane, xylene, cyclohexanone, methylene chloride, acetone and methyl ethyl ketone. Of these, however, only cyclohexanone is considered really practical. Dioxane is toxic and is of concern with regard to peroxide formation. Methylene chloride is highly volatile, tends to result in gelling of the reaction mixture and is not an accepted formulation solvent. Acetone and methyl ethyl ketone are volatile and/or have low flash points and are less desirable formulation solvents. Xylene is a known formulation solvent (in admixture with coupling solvents) but is toxic and is not as widely used as previously.

It is believed that at least some of the various esters and glycol diethers known to be solvents for epoxy resins are also suitable reaction media for the process of the present invention, at least for those resins of the preceding Formulas I or II having relatively low n values and/or derived from mononuclear bis-phenols (catechol or hydroquinone, for example).

When the solvent employed as the reaction medium is not strongly hydrophilic, it can be expected to less strongly (or not at all) solvate the acid P—OH groups—which is advantageous. However, it will also be a poorer solvent for the acid source material ($P_2O_5$ and condensed varieties of $H_3PO_4$, for example). In this event, use of pre-formed acid/blocking agent reaction product, as a more soluble form of the acid source material, is indicated.

REACTION PARAMETERS

Phosphorylation

The phosphorous-to-oxirane reactant ratio is controlled according to how much free acid can be tolerated in the final product. As discussed in the above-cited U.S. patent application, it is not necessary to convert even half of the oxiranes introduced (in the epoxy resin) to (salifiable) phosphoester groups in order to obtain a salified product which does not require the presence of a coupling solvent (in order to exist as a stable, aqueous dispersion). As many as about 12 out of every 13 of the oxiranes may report in the product as 1,2-dihydroxy (glycol) groups without resulting in a salified product which is not water-dispersible. When the reaction medium employed in the present method is a coupling solvent, even less than the minimum amount (that which provides about 0.3 P—OH's per oxirane) of acid source material specified in said application may suffice. However, as a general rule, the amount of the acid source material used in the present process will be such as to provide from about 0.1 to about 0.2, preferably about 0.1 atoms of phosphorous per oxirane when the cured product must be water (or steam) insensitive. For other applications, where water sensitivity is less of a problem, higher amounts of acid source material will be acceptable. In general, however, amounts providing more than about one phosphorous per oxirane will be unnecessary (and can even result in so much free acid that the corresponding salt formed from it during salification may cause phase separation in the final product mixture).

Pressure is not a critical variable in the present process, except that a pressure at least equal to the autogenous pressure of the reaction mixture must be maintained if the reaction temperature is to be held at or above the initial boiling point thereof. Ordinary ambient pressures are preferred but reduced pressures are also suitable when the blocking agent and/or reaction medium are relatively high boiling.

The phosphorylation temperature is important in three respects: polymer solubility, reaction rate and reaction mixture viscosity; each of which varies with temperature in the expected manner.

For uses of the end product in which relatively low solvent contents are essential, the solids content of the reaction mixture must be high and elevated temperatures will generally be necessary to dissolve the epoxy resin at a useful rate.

Once formed, the solution may not phase-separate upon cooling to ordinary temperatures, but—at least when the epoxy resin has a relatively high n value—will be so viscous as to be practically unstirrable. Thus, adequate dissemination of even a pre-formed, miscible acid source material, without re-warming the mixture (which will result in substantial progress of the phosphorylation reaction) will generally require the addition of extra solvent and a corresponding lowering of the solids content. Thus, carrying out the reaction at ordinary ambient temperatures (say 20°–30° C.) will ordinarily not be practical. However, such temperatures are considered operable for lower molecular weight epoxies (DER*-332—the diglycidyl ether of bisphenol A, for example; *trademark of The Dow Chemical Company) and/or at higher dilutions. Reaction times of from several hours to several days should suffice. (It is neither necessary nor desirable to attain an equilibrium condition; it is sufficient to proceed until the polyester (di- and triester) content rises far enough and preferably peaks (the "free acid" content preferably drops to a minimum) and subsequently (preferably immediately) to initiate hydrolysis.)

Phosphorylation temperatures of from about 120° to about 130° C. are generally preferred. Within this range, the reaction can be effectively terminated by initiation of hydrolysis) after a reaction time of about 0.5 hour, even though the actual times required for the polyester contents to peak will vary with the particular temperature. (The peaks are gently rounded, rather than sharp). At temperatures within the range of about 100° to 115° C., the reaction can be allowed to proceed from about 60 to about 45 minutes before hydrolysis is initiated. At a temperature of about 145°, 20 minutes suffices. At about 160°, 5–10 minutes is sufficient. (At the latter temperature, side reactions detrimental to use of the end products as coatings become of concern and still higher temperatures are considered generally impractical.)

The viscosity of the phosphorylation mixture goes through a maximum after the reaction has been on-going for about 15 to 20 minutes. The effect of temperature on this viscosity maximum is illustrated by the data, in Table I following, obtained with DER-667 and polyphosphoric acid (in amount equivalent to about 0.9 phr of $H_3PO_4$) in EB, at about 74% "solids".

TABLE I

| Temperature °C. | Maximum Viscosity CPS |
|---|---|
| 145 | 10,000 |
| 130 | 32,000 |
| 120 | 80,000 |
| 110 | 180,000 |

It is apparent from the Table that a very substantial reduction in viscosity can be achieved by increasing the reaction temperature by 10° C. (thereby avoiding the necessity of adding excessive amounts of solvent). This effect is dramatically illustrated by the fact that, at a temperature of about 160° C., it is possible to form a stirrable, homogenous mixture of DER-667, EB and a pre-formed $P_2O_5$/EB acid source material, even though the "solids" (resin +$P_2O_5$) content of the mixture is about 91%.

It should be noted that much higher viscosities would be experienced at all temperatures, but for the effect of the "blocking agent". That is, the average number of resin molecules attached to the phosphorous in each di- or triester group would not be less than two.

It is preferable, from the standpoints of both processing time and product quality (final monoester content, etc.) to "terminate" the addition (initiate hydrolysis, more precisely) within the "time window" extending from a few minutes before the "free acid" content reaches a minimum to the time when oxirane conversion is about 95% complete. (At a temperature of 125° C., for example, this window extends from about 25 minutes to about 35 minutes.) However, at the cost of higher final free acid contents and lower monoester contents (see Example 13 herein) the adduction (phosphorylation) can be allowed to continue for up to 5 hours, or even longer, before hydrolysis is initiated.

As a rule of thumb, hydrolysis may be initiated within about 10 to 15 minutes after the viscosity peak for the reaction mixture has been noticed; this can be done automatically in response to the time variation of the stirring power required to maintain a pre-selected rpm.

In any case, once the highest permissible "free acid" content prior to hydrolysis is established for a given resin/acid source material/solvent combination, the hydrolysis can be initiated as soon as that level has been reached, even though the acid content would drop further if the phosphorylation were allowed to continue.

Hydrolysis

The amount of water required, as a minimum, is the stoichiometric amount for the least acceptable degree of conversion of the phosphodi- and triesters present to epoxide-derived phosphomonoesters (including difunctional such esters, i.e., those in which both oxiranes in the epoxides molecule are converted to monoester groups). This can be calculated from the free acid, mono-, di- and triester contents of the phosphorylation mixture—as determined by titration (and gel permeation chromatography and $^{31}$P-NMR (nuclear magnetic resonance)). However, it is generally unnecessary to do this, since the final product will be diluted with considerably more than the minimum amount of water. It has been found that as little as 1 phr of water is adequate when the epoxide resin is DER-667 and 2 phr will usually be more than sufficient, even for lower EEW resins. As a general rule, substantially more than 2 phr of water should not be introduced until after the hydrolysis mixture has been salified (i.e., the amine has been introduced).

Since the reaction mixture temperature will usually be in excess of 100° C., it is convenient to add the hydrolysis water as a pre-formed solution in a high-boiling solvent such as EB. However, this is not essential and the water can be injected under pressure or "bombed" in.

The hydrolysis temperature is important with respect to the rate of hydrolysis (i.e., process time requirements), pressurization requirements and selectivity between mono- and polyester groups (which involves preferential hydrolysis of blocking-agent derived PO—O—C groups).

As would be expected, the rate of hydrolysis goes up as the temperature is increased. This is advantageous in that the process can be concluded more rapidly if it is not necessary to cool the phosphorylation mixture before initiating hydrolysis (adding the water). However, the higher the phosphorylation temperature, the more rapidly the polyester content maximizes and the more rapidly it declines thereafter; the "time window" for water addition at the optimum reaction stage (to achieve maximum oxirane-derived monoester and minimum free acid contents in the hydrolyzed product) is accordingly narrower. Also, operation under pressure is necessary, to maintain a given concentration of water in the liquid phase, when operating at temperatures, substantially above 100° C.

Although the mole fraction of water in the mixture will be relatively small, the vapor pressure of the reaction mixture is not insignificant (particularly when a lower boiling solvent is used as the reaction medium) at temperatures above 100° C. and at least enough pressure must be maintained in the reactor to permit condensation of the evolved vapors (it is convenient to maintain temperature control by refluxing).

The most important consideration as to the hydrolysis temperature is not to exceed the temperature at which the rate of hydrolysis of oxirane-derived phosphomonoester groups becomes intolerable. (The other ester moieties in a phosphopolyester, whether derived from blocking agent or epoxide molecules, are more readily hydrolyzed—at moderate temperatures—than the last oxirane-derived ester moiety.) As a general rule, hydrolysis temperatures ranging from about 90° C. to about 130° C. are practical, but it is preferred—at least for applications in which low final contents of free acid are essential—to stay within the narrower range of from about 115° to about 125°.

As a good compromise between first-stage viscosity considerations, overall process time requirements and final product quality, the same temperature—within the range of from about 120° to about 125° C.—is maintained during both the phosphorylation and hydrolysis steps. Thus, at a temperature of about 122° C. (the reflux temperature at 760 mmHg for 2 phr $H_2O$ in a 74% solids-667/EB/polyphosphoric reaction mixture), two hours is an appropriate hydrolysis time. (At a temperature of about 100° C., times of from 4 to 4.5 hours are required.)

Hydrolysis temperatures of up to 150° C. may be operable, provided that the reaction can be effectively quenched after a short contact time (say 5 to 15 minutes).

Phosphorylation and Hydrolysis Times

Suitable contact times are as follows.

For the phosphorylation step, times ranging from about 5 minutes (at 160° C.) to several days (at 20°–30° C.) are considered suitable. All other factors being equal, the shorter the contact time the better, but in the preferred reaction temperature range (120°–130° C.), from about 35 to about 25 minutes is generally satisfactory. For phosphorylation of DER-667, about 30 minutes (at 122°–125° C.) is presently considered optimum.

For the hydrolysis step, times of from about 5 minutes (at 150° C.) to about 6 hours (at 100° C.) are considered suitable. At 130° C., one hour will usually be sufficient. In the preferred temperature range (about 115° to about 125° C.), times from about 3 to about 1½ hours are appropriate. Two hours (at 122° C.) is presently considered optimum for DER-667-derived phosphorylation products.

Those knowledgeable in the art will recognize that somewhat different hydrolysis times than those indicated above may be appropriate when more or less readily hydrolyzed phosphoester groups are formed by the reaction of the blocking agent with the acid source material. However, these times may readily be determined without undue experimentation. Also, it will not be necessary to attain the maximum possible monoester content in all cases.

Salification and Solvent Addition

Suitable bases and the manner of introducing them are generally as disclosed in the above-incorporated reference patent (U.S. Pat. No. 4,289,812). Organic bases and tertiary amines in particular are preferred. An equivalent of base for every P—OH in the hydrolyzed resin product is not necessarily required. As a minimum, only as much of the base is required as suffices to maintain the resin in a dispersed state during (and subsequent to) introduction of the water employed in the final formulation.

The presently most preferred base, at least for products derived from DER-667, is dimethylaminoethanol (DMAE). It has been found that the amine level affects not only the size of the salified hydrolyzate particles but also the viscosity of the system upon inversion (by water addition) and the coating rheology of the final formulation. A further complication is that the optimum amine level is dependent on the relative amounts and kinds of the other components of the organic phase. For EB solutions of hydrolyzed product resins derived from DER-667 and having low free acid contents, about 1.2 parts of DMAE per 100 parts of the -667 starting resin is considered optimum—particularly for spray applications (of the inverted system).

For other reaction media (or combinations thereof with various separate blocking agents), other amines (triethylamine, for example) may be better suited to a given application and amine to starting resin mole ratios greater or less than that corresponding to 1.2 parts of DMAE per hundred parts of DER-667 may be more appropriate. For any specific phosphorylation/hydrolysis product, this can readily be determined by practicing coatings chemists, without resort to undue experimentation.

As a general rule, it is highly preferable to salify the hydrolyzate (introduce the amine) before adding very much water to the system.

Better dispersions result if the hydrolysis mixture is cooled to a temperature of about 85° C. (or less) before the amine is added. This ordinarily requires heat removal (unless water addition prior to salification is practiced) but the amount of heat which must be removed can be reduced by pre-incorporation of the solvent(s)—such as n-butanol, for example—to be included in the final formulation. (Solvent addition prior to salification is also advantageous in reducing the viscosity of the system, thereby facilitating mixing with the amine and the water.)

EXAMPLES

The following examples are for purposes of illustration and are not to be construed as limiting the scope of the present invention in a manner inconsistent with the claims appended to these specifications. Unless indicated differently, the EEW of the DER-667 used in the examples (except Example F) was about 1800.

ANALYTICAL

"Free acid" and ester contents of the reaction mixtures, after successively longer contact times, were determined by titration as follows.

Samples ($\sim$10 g) were removed from the reaction mixtures at regular intervals, dissolved in 50 ml of $CH_2Cl_2$ and added to 100 ml of a 3:1 toluene/butanol solution. They were extracted 3 times with 75 ml each of distilled water, adding 10 ml of butanol when needed to control emulsion formation. The aqueous extractions were combined and titrated to first and second end points using 0.1 N NaOH (using a Metrohm Herisan, E 535 and E 536, automatic titration instrument) to determine water extractable acids. The difference between the first and second end points was taken to represent the molar value for free acid. The organic raffinate was titrated in much the same manner using methanolic TBAH (tetrabutylammonium hydroxide) as the base. The difference between the first and second end point was taken to be the molar equivalent for monoester. The first end point minus the monoester equivalents was taken as the diester molar equivalents and the triester concentration was calculated from total charged phosphate molar equivalents minus the values for free acid, monoester and diester. Solids determinations were performed using 1-2 g samples of material which were weighed before and after heating at 200° C. for 2 hours.

$^{31}P$ NMR analyses (utilized as a check on titration results and to provide additional information about phosphorylate and hydrolysate compositions) were carried out on a JEOL FX-60 NMR instrument equipped with a 10 mm phosphorous probe insert operating at 24.15 MHz and ambient temperatures. The phosphorous observe frequency typically had an offset of 56.2 KHz, the proton signal was decoupled at setting of 47.7 KHz (Hetero/Noise, 0.5 KHz) and a deuterium source (usually acetone-$d_6$) was used as the internal lock frequency. A 12$\mu$ SEC (90°) single pulse sequence with a 1 second pulse delay and an acquisition time of 8 seconds was routinely used. The spectral width and filter were set at 500 Hz, thereby yielding 8 K data points per spectrum.

Identification of the $H_3PO_4$ absorption was performed by spiking samples with a 1:1 solution of acetone-dioxane containing 1% amine neutralized $H_3PO_4$ and observing an increase in the $H_3PO_4$ peak. The chemical shift of this absorption was highly dependent upon concentration and the pH of the neutralized samples. An external sample of tri-n-butyl-orthophosphate (1% in acetone/dioxane) was placed in a 5 mm tube inside the larger 10 mm NMR tube to reference the phosphate multiple esters.

Resin samples were prepared by dissolving 2 g of 65-85% N.V. material in 2 g of dioxane and neutralizing this mixture to pH>10 with 0.2 to 0.4 g of triethylamine (TEA). Then 2 g of this mixture was placed into a 10 mm NMR tube with 1 g of acetone-$d_6$ and mixed until homogeneous. Further Transform Spectroscopy was used, collecting from 1000 to 5000 transients, and displaying the region of interest as either a 250 Hz or 500 Hz full width scan.

The peak assigned to the dominant (2-hydroxy) isomer of the resin monoester—believed to be the 2-hydroxy isomer,

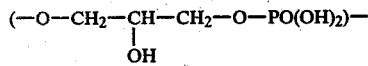

was conveniently utilized as an internal reference in a number of scans. The peak assigned to the EB monoorthophosphate was also so utilized in some scans.

Phosphorus NMR provides information as to the distribution of the phosphorus (charged as the acid source material) among different phospho species but does not provide a direct indication of the proportions of oxirane (in the starting resin) reporting as 1,2-glycol and phosphoester groups in the hydrolysate. However, the latter information can be deduced from the equivalents of oxirane converted and the amounts of free acid, mono-, di- and triesters formed (as disclosed in the above-referenced application).

"Examples" 1A-1F are only for the purpose of comparison. They are representative of processes NOT meeting all of the limitations in the foregoing definition of the invention. In all of these examples but F, 85% aqueous $H_3PO_4$ was employed as the acid source material and the reaction medium consisted predominantly of a glycol-monoether. The "solids" (DER-667+$H_3PO_4$) contents of the phosphorylation mixtures ranged from about 61 wt. % to about 74 wt. %. In Example F, the acid source material was a preformed EB/$P_4O_{10}$ reaction product but a formulation-acceptable solvent was not employed as the reaction medium.

EXAMPLE 1

A. Phosphorylation of DER-667 with ~1 phr $H_3PO_4$ (as 85% acid) in aqueous EB (61% solids).

A one-liter flask was charged with 250 grams of DER-667, 135 grams of EB and 3 grams of water. The mixture was heated to 110° C. (with stirring) and a solution of 3 grams of 85% aq. $H_3PO_4$ in 10 grams of MEK (methyl ethyl ketone) was added. Heating was continued for four hours at reflux (~110° C.). The reaction mixture was cooled, neutralized with triethylamine and tested for dispersibility in water—with negative results.

Failure to obtain a dispersion—despite the presence of the EB (and MEK)—is attributed to the continuation of a relatively high water-to-acid ratio (0.192/0.026=7.4 moles/mole) and a strongly acid-solvating reaction medium.

B. The reaction of Example A was essentially duplicated, except that PM (the monomethylether of propylene glycol; a less strongly acid-solvating solvent) was employed (with no other solvents) as the reaction medium. When neutralized with triethyl amine, the hydrolysis mixture was not dispersible in water alone but was dispersible in a 1:1 EB/$H_2O$ solution. The ability of the dispersion to wet tin-free steel was poor.

C. Similar to B, but higher initial solids content and a still less strongly acid-solvating reaction medium used. Lower reaction temperature.

A two-liter flask was charged with 300 grams of DER-667, 100 ml of PiBT (isobutoxy-2-propanol), 25 ml of MEK and 2 ml of water. The mixture was heated to 95°, 3.5 grams of 85% $H_3PO_4$ in 25 ml MEK was added and the temperature raised to 100° C. Stirring difficulties were encountered (solids content ~69%) and, after 2 hours of heating, 60 ml of solvent (EB) had to be added to lower the viscosity enough to permit withdrawal of analytical samples; this lowered the solids content to about 61%. After 5 hours total contact time, the reaction was terminated (by cooling) and the resulting mixture neutralized with triethylamine.

The neutralized mixture was completely dispersible in water. The dispersion exhibited good wetting characteristics and, when formulated with 8.75% of the crosslinker used in Example E and cured 2 minutes at 200° C., produced a coating which exhibited only a slight blush after one hour in boiling water. However, the viscosity of the reaction mixture, even after dilution to a relatively low solids content, was such as to require excessive power for stirring in commercial scale operations.

A comparison of "free" acid contents for the unneutralized hydrolysis mixtures of Examples A, B and C is given below.

| Example | Predominant Solvent In Reaction Medium | Free Acid Millimoles/gram Resin |
|---|---|---|
| 1-A | EB | $2.3 \times 10^{-2}$ |
| B | PM | $1.9 \times 10^{-2}$ |
| C | PiBt | $1.2 \times 10^{-2}$ |

It will be seen that an acid content equal to or lower than $1.5 \times 10^{-2}$ mmoles/g was obtained only in Example C.

D. Similar to A, but lower H₂O/acid ratio (for first half hour), higher solids content and less strongly solvating reaction medium.

A two-liter flask was charged with 600 grams of DER-667, 110 ml of EB, 55 ml of xylene and 40 ml of MEK. The mixture was heated to 110° C. and 7 grams of 85% aq. $H_3PO_4$ (~1:1 mole ratio $H_2O/H_3PO_4$) in 25 ml of MEK added. Heating was continued at reflux (110° C.) for thirty minutes and then 10 ml of water in 50 grams of EB was added and the reaction continued 3.5 hours. The viscosity of the resulting hydrolysis mixture (~73.5% solids) was so high that dilution (with n-hexanol, 83 ml) was necessary in order to retain sufficient fluidity upon cooling. When neutralized with triethylamine, the diluted mixture was completely dispersible in water.

The dispersion wet tin-free steel coupons well but, when cured (with a standard melamine/formaldehyde crosslinker), the resulting coating exhibited only fair water resistance.

E. Similar to D, but using PiBT as the reaction medium (without other solvents) and operating at a lower solids content (~69%).

A two-liter flask was charged with 600 grams of DER-667, 280 ml of PiBT and 25 ml of MEK. The mixture was heated to 108° C., 7.5 grams of 85% $H_3PO_4$ in 25 ml MEK was added and heating was continued at reflux (~108° C.) for another 30 minutes. At this point, 10 ml of water was added (slowly enough to avoid dropping the temperature below 106° C.) and refluxing was continued another 3.3 hours. 100 ml of n-hexanol was added to ensure adequate fluidity of the mixture upon cooling.

A sample of the hydrolysis mixture, when neutralized with triethylamine, was dispersible in water. The dispersion had excellent wetting properties on tin-free steel and—when applied as a mixture with a hexylcarbitol solution of a melamine/formaldehyde crosslinker (CYMEL 303; trademark of American Cyanamid Co.) and cured 2 minutes at 200° C.—gave a coating exhibiting no blush or less of adhesion after one hour in boiling water.

It is evident from the results of Examples D and E that maintaining a lower water-to-acid ratio (until oxirane conversion is substantially complete; i.e., for about 30 minutes) is quite helpful but running the reaction in PiBT apparently would be necessary to achieve adequately low free acid contents. PiBT solutions of the (DER-667-derived) hydrolysate having satisfactorily high solids contents, however, are so viscous as to require excessive stirring power on a commercial scale. Also, the hydrolysis rate is lower in the less hydrophilic PiBT.

F. Further reduction of water/acid ratio (to essentially zero) by use of pre-formed $P_2O_5$/EB reaction product as acid source material.

EB was added—under anhydrous conditions—to a stirring slurry of $P_4O_{10}$ in hexane over a period of one hour (EB/P ratio ~1), the temperature rising to about 55°. The reaction mixture was allowed to cool while stirring was continued for two hours. A little more EB was added, to ensure complete $P_4O_{10}$ conversion, and stirring continued (without application of heat) for 2 hours more; the reaction mixture was allowed to stand overnight. Analysis (by $^{31}P$ NMR) of a sample of the product mixture showed that over 80% of the $P_4O_{10}$ was present in the form of the symmetrical bis-butoxyethyl pyrophosphate.

The latter product was isolated, essentially free of other phospho species, as a hexane-insoluble, and dissolved in toluene. Separate portions of the solution were combined with separate solutions of DER-332 (the diglycidyl ether of bisphenol A, essentially) at mole ratios of 1:1, 2:1 and 4:1.

A reaction ensued, upon heating each of the resulting mixtures, with formation of a rubbery gel in each case. It was found that the 1:1 and 2:1 gels would slowly dissolve in hot water (hydrolyze) to produce water-soluble, acidic monophosphoesters, which, when neutralized with ammonia or amines and cured with CYMEL-303, gave tough, resinous products. (Water resistance of these products was not checked.) The 4:1 gel would only partially dissolve in hot water.

The foregoing results tend to confirm the results disclosed in the above-referenced application as obtained when a condensed form of phosphoric acid is employed—even though the P—OH functions of the acid have been partially blocked by esterification with EB. That is, gelling occurs (at least in a medium-like toluene) when water is not added until the phosphorylation has run its course.

EXAMPLE 2

Acid source material a pre-reaction product of $P_4O_{10}$ with phenol; EB reaction medium.

2.2 Grams of $P_4O_{10}$ was mixed, at room temperature, with 5.8 grams of phenol (2OH per P) and 2 grams of $CH_2Cl_2$. The $P_4O_{10}$ dissolved slowly and not quite completely, so 5 grams of EB was added. The $P_4O_{10}$ still did not completely dissolve but the mixture was washed into a dropping funnel with another 10 grams of EB and the resulting solution added over a ten minute period to an agitated solution of 300 grams of the -667, 100 grams of EB and 10 grams of MEK, maintained at 110° C. in a 1-liter, 3-necked flask. The resulting mixture (solution) was stirred at 120° C. for 1 hour and allowed to cool (1 hour and 20 minutes) to 80° C. Five ml of water was added and the resulting mixture heated to 105° (in 15 minutes) and at 111°–114° C. for a total heating (hydrolysis) time of 4 hours. The course of the hydrolysis was followed by titration of successive samples taken at the point of water addition and hourly thereafter. The contents of free acid, mono-, di- and triester (based on a 71% solids content in the hydrolysate) are given, for samples 1, 2, 3 and 5, below.

| Sample No. | Hydrolysis Time in Hours | Free Acid | Monoester | Diester | Triester |
|---|---|---|---|---|---|
| 1 | 0 | $0.52 \times 10^{-2}$ | $1.72 \times 10^{-2}$ | $3.17 \times 10^{-2}$ | $4.09 \times 10^{-2}$ |
| 2 | 1 | 0.80 | 4.50 | 2.62 | 1.58 |
| 3 | 2 | 0.98 | 6.01 | 1.74 | 0.77 |
| 5 | 4 | 1.26 | 7.23 | 0.96 | 0.05 |

Millimoles per gram of solids

When neutralized with triethylamine, the hydrolysate took up water very well and, in the form of the following formulation (30% solids; VOC 0.27), exhibited good wetting properties on tin-free steel and cured to a coating which showed no blushing when boiled 1 hour in water: hydrolysate, 24.9 grams; water, 35 grams; triethylamiine, 0.4 grams; dimethylaminoethanolamine, 0.17 grams; and 0.415% solution of CYMEL-303, 3.70 grams.

The results of $^{31}$P NMR analysis of the final hydrolysate (utilizing the dominant monoester (oxirane-derived) peak (tentatively assigned to the 2-hydroxy-1-phosphoester isomer) as an internal standard (0 Hertz).

| Component | % P[1] | Chemical Shift, Hertz |
|---|---|---|
| —C—C—OPO(OH)$_2$<br>\|<br>OH | 65 | 0 |
| —C—C—OH<br>\|<br>OPO(OH)$_2$ | 16 | −17.0 |
| Free acid | 3 | −43.8 |
| Diesters | 9 | −82.3 |
| Triesters | 7 | −98.4 to −114.5 |

[1]Percent of phosphorus charged which reports in component.

It is evident from the foregoing results that delaying initiation of hydrolysis by more than two hours (1 hour at 120°, then declining to 80°) did not result in an excessive free acid content of an unacceptably low monoester content.

Phenol (regenerated by ester hydrolysis) presumably would not be acceptable as a component of a beverage can lining but could be acceptable in other applications.

EXAMPLE 3

Butanol-1/P$_4$O$_{10}$ pre-reaction product as acid source material. EB reaction medium. 64% solids.

A. A pre-reaction mixture of 4.65 g (0.0165 mole) of P$_4$O$_{10}$ in 10 grams (0.135 mole) of n-butanol was added to a dropping funnel with 10 ml of DOWANOL* EB (*trademark of The Dow Chemical Company). A two-liter, three-neck flask with 600 g (0.333 equiv.) of DER* 667 (*trademark of The Dow Chemical Company) in 190 ml of DOWANOL EB and 20 g of MEK (for viscosity control) was heated to 101° C. and the premix-phosphate ester solution added with stirring. The mixture was heated to 125° C. for 1 hour, yielding a viscous mixed phosphate ester solution. Titration analysis of the water-insoluble portion of the phosphorylated material indicated it was predominately a triester of orthophosphate containing both hydrolyzed epoxide and solvent. Phosphate hydrolysis was performed by the addition of 10 g of water and heating to 116° C. with stirring for 4.5 hours to obtain a mixed reaction product in which 68% of the charged P$_4$O$_{10}$ was present as epoxide-derived phosphomonoester groups. Upon neutralization with triethylamine this product was found to be water-dispersible. (The latter product included 75 grams of hexanol, which had to be added to the hydrolysate to thin it sufficiently to pour it out of the reaction flask.)

The free acid and ester contents of the reaction mixture at the point of water addition (sample #1) and at hourly intervals thereafter are given below.

| | Millimoles per gram solids | | | |
|---|---|---|---|---|
| Sample | Free acid | Monoester | Diester | Triester |
| 1 | 0.26 × 10$^{-2}$ | 1.31 × 10$^{-2}$ | 2.37 | 6.06 |
| 2 | 0.48 | 3.14 | 2.52 | 3.86 |
| 3 | 0.65 | 4.83 | 2.35 | 2.17 |
| 4 | 0.88 | 5.92 | 1.81 | 1.39 |
| 5 | 0.87 | 6.77 | 1.32 | 1.04 |

$^{31}$P NMR confirmed the relatively high content of polyesters in the product and the scan included a peak (−109 Hertz from the dominant monoester peak) attributed to tributyl phosphate.

It is evident by comparison with Example 2 that the phosphoester groups derived from n-butanol are substantially more resistant to hydrolysis than those derived from phenol. However, the consequently higher polyester and lower monoester contents obtained (with n-butanol as the blocking agent) are apparently compensated by the lower free acid content and a water-dispersible product results.

B. A pre-reaction mixture of 5.5 grams (0.0194 moles) of P$_4$O$_{10}$ and 15 grams (0.2025 moles) of n-butanol was rinsed with 20 grams of EB into a stirring, hot (105° C.) solution of 750 grams of DER-667 (EEW ~ 1800) in 180 grams EB and 20 grams of MEK in 5 minutes. The resulting mixture was stirred at 105° C. for 1.5 hours and then hydrolyzed for 6.5 hours at about 102° C., a total of three 10 ml portions of water being added during that time.

The acid and ester contents in samples of the hydrolysate taken after 5 and 6.5 hours of hydrolysis were as follows.

| Hydrolysis | Millimoles per gram solids | | | |
|---|---|---|---|---|
| Time | Free acid | Monoester | Diester | Triester |
| 5 hours | 0.67 × 10$^{-2}$ | 5.98 × 10$^{-2}$ | 1.37 × 10$^{-2}$ | 1.98 × 10$^{-2}$ |
| 6.5 hrs. | 0.84 | 6.89 | 1.21 | 1.06 |

The final hydrolysate (68.5% solids, by calculation, and 70.5% non-volatiles (by oven test; includes residual EB) was diluted with 70 grams of n-butanol and the resulting solution neutralized and formulated to an aqueous, 25% solids, dispersion (like that in Example 2). The formulation wet tin-free steel well and gave a cured coating which passed the one hour water boil test.

It is evident by comparison with the results in Example 3A above that further diester conversion results upon prolonged hydrolysis but the residual triester—presumably tributyl phosphate—is essentially unchanged. However, the hydrolysis-resistant ester does not detrimentally affect the utility of the (neutralized) hydrolysate to a noticeable extent.

EXAMPLE 4

Butanol/P$_4$O$_{10}$ pre-reaction product as acid source material. Hexanol/Butanol (and MEK) as reaction medium. 75% solids.

To a solution of 750.8 grams (417 milliequiv.) of DER-667 (EEW 1800) in 125 grams n-hexanol, 100 grams n-butanol and 25 grams of MEK, was added a solution of 5.75 grams (20.2 millimoles) of P$_4$O$_{10}$ in 25 grams (337.8 millimoles) of n-butanol. The mixture was stirred 1.5 hours at a temperature of 120°±1° C., then 15 grams (833.3 millimoles) of water was added (slowly, to avoid excessive refluxing). The temperature dropped to 105° C. After 2 hours of hydrolysis, the heat was turned off and the reaction mixture allowed to cool to and stand overnight (16.25 hours) at room temperature.

A sample was taken for analysis and heating resumed for 4 hours more of hydrolysis (at 103°-4° C.). A final analytical sample was then taken; the acid and ester contents were as follows:

| free acid | 0.74 × 10$^{-2}$ | millimoles/g solids |
|---|---|---|
| monoesters | 2.65 | |

-continued

| | |
|---|---|
| diesters | 3.14 |
| triesters | 3.47 |

The evident incompleteness of hydrolysis (even after 6 hours at 103°–5° C.) was confirmed by $^{31}$P NMR. Although substantial additional hydrolysis occurred in the second (4 hour) heating period, the overall extent of conversion of polyesters to monoesters (and free acid) was unusually low. This is attributed to the essentially hydrophobic nature of the reaction medium (n-hexanol is only slightly soluble in water) and illustrates the necessity of using a reaction medium which is substantially hydrophillic.

EXAMPLE 5

High (~80%) solids. $P_4O_{10}$/2-butanol pre-reaction product as acid source material. EB as reaction medium.

800 Grams (0.444 equivalents) of DER-667 containing 0.45% (3.6 grams, 0.2 mole) $H_2O$ was dissolved with 180 grams EB and 20 grams of MEK at 105° C. To this solution was added dropwise a solution of 6.0 grams (0.0211 mole) of $P_4O_{10}$ in 15 grams (0.202 moles) of 2-butanol (and 20 grams of ED added post-reaction). The addition—carried out at 105°–110° C.—required 10 minutes.

The resulting mixture was stirred at 110°–125° C. for 1.5 hours, at which time the temperature was 118° C. and the viscosity of the reaction mixture was noticeably higher. The mixture was cooled to 100° C. and 15 grams (0.83 mole) of water was added (total water then 18.6 grams or ~1.8%). The temperature was then raised to 105° C. (in 15 minutes) and held at 105°–110° C. for 3 hours, at which point an analytical sample was taken and hydrolysis continued for another 2 hours at 106° C. A final sample was taken for analysis.

The acid and ester contents* after 3 and 5 hours hydrolysis (ignoring whatever hydrolysis may have resulted from concurrent action of the water in the resin during esterification) were as follows:
(*mmoles/gram solids)

| Time | Free acid | Monoesters | Diesters | Triesters |
|---|---|---|---|---|
| 3 hrs. | $0.65 \times 10^{-2}$ | $4.24 \times 10^{-2}$ | $2.67 \times 10^{-2}$ | $2.5 \times 10^{-2}$ |
| 5 hrs. | 0.73 | 4.89 | 2.28 | 2.1 |

A 40% (by test) non-volatiles dispersion was prepared (by neutralization and water-thinning) and had the composition: 100 parts by wt. of starting resin, 25 phr of EB, 120 phr water, 1.03 phr DMAE, 0.67 TEA (and 0.75 phr of the converted $P_4O_{10}$).

1.75 grams of CYMEL 303 in 3.75 grams of n-hexanol was added to 50 grams of the dispersion, plus 4 grams EB, 25 grams of n-butanol and 27 grams of water, thereby converting it to a 25% non-volatiles formulation capable of being coated onto tin-free steel and cured thereon to an adherent, water-resistant film.

It is apparent from this example that the esterification and hydrolysis steps can be carried out, according to the present invention, at solids contents of 80% and with an epoxide which is not anhydrous, without development of unmanageable viscosities or excessive free acid contents; a water-thinnable product can be obtained under such conditions, even though the blocking agent used results in difficulty hydrolyzeable polyesters and a correspondingly low monoester content.

EXAMPLE 6

EB/$P_4O_{10}$ pre-reaction product as acid source material. Reaction medium EB. 72.5% solids. Esterified 1.5 hr. at 110°–120° C. and hydrolyzed 3.5 hours at 112° C. (1.89% water).

A 100-gallon reactor equipped with condenser and agitator was charged with 159 kg (88.4 equivalents) of DER-667 and 53.6 kg (453 moles) of EB. The mixture was heated to 110° C. and approximately 6 liters of phosphate ester solution (3.95 moles $P_4O_{10}$ in 38.88 moles EB) was added (in 0.5 hours at 110° C.) with agitation and the mixture heated at 120° C. for one hour—at which time more than 95% of the charged oxirane groups had been converted. The resulting phosphate ester mixture was then hydrolyzed by adding (injecting) 2 liters of water, heating for two hours at 112° C., adding another 2 liters of water and heating at 112° C. for an additional 1.5 hours. The hydrolyzed product was analyzed and it was found that 76% of the charged $P_4O_{10}$ was present as epoxide-derived phosphomonoester groups. Free phosphoric acid was found to account for less than 10% of the total $P_2O_5$ charged. Upon neutralization with amine (TEA), this hydrolysis mixture was found to be water-dispersible. The percent non-volatiles (including residual EB) in the hydrolysate was found (by heating a sample 3 hours at 200° C. in an air-swept oven) to be 74.4%.

The acid and ester contents found by titration of a final hydrolysate sample are given below.

| | | |
|---|---|---|
| free acid | $0.97 \times 10^{-2}$ | millimoles/g solids |
| monoester | 7.58 | |
| diester | 0.53 | |
| triester | 0.62 | |

An aqueous dispersion containing 45.6% non-volatiles and having a particle size judged (by appearance) to be about 700–1000 Angstroms was prepared by adding 423.8 grams of n-butanol to 3255 grams of the final hydrolysis mixture, stirring in 24.22 grams each of triethylamine and dimethylethanolamine and then mixing in 3192.76 grams of water. 128.52 Grams of this dispersion was combined with 4.4 grams of CYMEL 303 dissolved in 8.75 grams hexanol, 0.88 grams n-butanol and 2.02 grams of EB. The resulting mixture was adjusted (diluted) to a non-volatiles content of 25% by addition of 55.43 grams more of water. The final formulation had a #2 Zahn viscosity of about 36–37 and demonstrated good wetting when drawn down on tin-free steel with a #18 wire wound rod. When cured 2 minutes at 200° C., the resulting film passed the one hour water boil test with no blushing and no loss of adhesion (standard tape pull test).

A pre-reaction product of $P_4O_{10}$ and EB, essentially identical to that employed in the esterification of this example, was examined by $^{31}$P NMR. The (proton decoupled) peak furthest upfield was assigned to the monobutoxyethyl ester of orthophosphoric acid and was utilized as an internal standard (O Hertz). A second peak at −27 Hertz was assigned to the bisbutoxyethyl ester of orthophosphoric acid and a third peak, at −300 Hertz, was assigned to the bisbutoxyethyl ester (predominantly symmetrical) of pyrophosphoric acid. A very small peak at −48 Hertz was assigned to orthophosphoric acid. From the un-decoupled spectrum, the relative amounts of the three major components were roughly estimated as: monoorthophosphate, 30% diorthophosphate, 30% and bis-pyrophosphate, 40 mol %.

A comparison by $^{31}$P NMR of a (neutralized) hydrolysate made in essentially the foregong manner with an otherwise closely comparable one made (in CH$_2$Cl$_2$/acetone with 1 phr of 85% H$_2$PO$_4$, from DER-667) by the method described in the above-referenced U.S. Pat. No. 4,289,812, showed essentially identical monoester peaks. However, the material made by the method of this example contained less free acid and included (hydrolysis-resistant) di- and triesters. Using the predominant ($\beta$-hydroxy) monoester as an internal standard, the composition of the two materials compare as follows:

Approximate
Chemical Shift/Mole % Phosphorus

| Hydrolysis Time | Chemical Shift/Mole % P (Approximately) | | | | |
|---|---|---|---|---|---|
| | —OH Monoester | —OH Monoester | Free Acid | Diester | Triesters |
| 4 hours | 0 Hz/59.2% | −16 Hz/19.7% | −47 Hz/2.2% | −72 Hz/11.0% | −92 to −110 Hz/7.9% |
| 5 hours | 0/61.8% | −16/20.6% | −47/3.1% | −72/7.4% | −92 Hz/5.9% −103 Hz/1.3% |

| Component | S.N. 019,958 | | Present Invention | |
|---|---|---|---|---|
| $\beta$-hydroxy, $\alpha$-monoester | 0 Hertz/ | 76% | 0 Hertz/ | 67% |
| $\alpha$-hydroxy, $\beta$-monoester | −17 | 19 | −17 | 16 |
| H$_3$PO$_4$ | −41 | 5 | −41 | 2 |
| Diester | — | 0 | −78 | 9 |
| Triester | — | 0 | −95 to −105 | 6 |

It should be noted that no MEK (or other diluent) was employed with the EB in this example; this resulted in an increased stirring power requirement in the earlier stages of the esterification.

Comparison of the results in the foregoing examples (2, 3, 5 and 6) shows that the ease of hydrolysis of the phosphoesters of the hydroxylic blocking agent decreases as its acidity decreases. That is, the ease of hydrolysis decreases in the order phenol, n-butoxyethanol (EB), 1-butanol and 2-butanol.

It will be recognized that the amount of water (0.2 mole) in the resin solution of Example 6 was more than enough (0.0211×6=0.1266 mole) to convert all of the charged P$_4$O$_{10}$ (0.0211 mole) to H$_3$PO$_4$(P$_4$O$_{10}$+6-H$_2$O→4H$_3$PO$_4$). However, it is believed that the residual water normally present in polyhydroxy, polyether epoxide resins is rather tenaciously associated (H-bonded). Accordingly, the esterification is considered to have taken place effectively in the absence of free water molecules. (See also Example 7.)

EXAMPLE 7

P$_4$O$_{10}$/EB pre-reaction product, comprising water, as acid source material. EB/MEK as reaction medium.

4.5 Grams (15.85 millimoles) of P$_4$O$_{10}$ was dissolved in 30 grams (254 m moles) of EB and 1 gram (55.6 m moles) of water added to the solution. The resulting mixture (solution) was added dropwise to a solution of 600.25 grams (about 333 milliequivalents) of DER-667 in 170 grams of EB and 20 grams of MEK, in six minutes and at a temperature of 100° C.

The temperature rose rapidly to 115° C. and the adduction (phosphorylation) allowed to proceed for 1.5 hours at 115°–132° C. 10 Grams of water was added (total water 11 grams, or ∼1.33%). The temperature dropped to 116° C. and the hydrolysis continued for 1 hour. 4 Grams more of water (total 15 grams of 1.81%) was added (temperature dropped to 114° C.) and then, after 2 hours more of hydrolysis, 5 grams of water (total 20 grams of 2.40%) was added and the hydrolysis continued another hour at 113° C. An analytical sample was taken at this point (total 4 hours hydrolysis time) and the hydrolysis prolonged another hour before taking a final sample and cooling the reaction mixture.

The acid and ester contents in the final product (65% non-volatiles, by test) were found (by titration) to be: free acid, 1.28×10$^{-2}$ m moles/g solids; monoester, 7.77×10$^{-2}$; diester and triester, about 1.03×10$^{-2}$ each.

$^{31}$P NMR comparison of the two samples taken after 4 and 5 hours total hydrolysis time showed a substantial difference in the extent of hydrolysis.

21 Grams of the hydrolysate solution was neutralized with 0.15 grams of TEA and formulated to 25.7% non-volatiles with 35.5 grams of water, 0.15 grams of DMAE and 3.23 grams of a 0.4154% solution of CY-MEL-303 in hexanol. The resulting dispersion exhibited good draw down and wetting on tin-free steel and gave a good coating when cured 2 minutes at 200° C.

It is apparent from the foregoing results that inclusion in the P$_4$O$_{10}$/EB pre-reaction product of a substantial amount of water (55.6/15.85=3.51 moles H$_2$O per mole P$_4$O$_{10}$) did not detrimentally affect the phosphorylation. This may be due to any or all of the facts that (1) the amount of water was less than that (6 moles/mole) required to completely convert the P$_4$O$_{10}$ to H$_3$PO$_4$, i.e., the P$_4$O$_{10}$+ the H$_2$O was equivalent to "113% H$_3$PO$_4$" (2) the water to EB mole ratio in the pre-reaction mixture was low 55.6/254=0.22, and (3) once formed, the phosphoesters of EB are somewhat resistant to hydrolysis and the time between water addition and introduction of the pre-reaction product to the epoxide was far short of that required for equilibration (the oxirane/P—OH reaction is initially quite rapid). In any case, the phosphorylation is again considered to have taken place effectively in the absence of free water molecules.

It is also apparent that at hydrolysis temperatures of about 113°–116° C., about 5 hours is required to achieve essentially complete hydrolysis when EB is employed (in a pre-formed acid source material) as the blocking agent.

EXAMPLE 8

Pyrophosphoric acid/EB reaction product as acid source material. EB as reaction medium. ∼75% solids. Esterification temperature 120°; hydrolysis temperature 117° C.

A 25 wt. % (18 mole %) solution of pyrophosphoric acid in EB was made up at room temperature and a portion of it neutralized with triethylamine, diluted with dioxane and hexadeuteroacetone and examined by $^{31}$P NMR, using tri-n-butyl phosphate as an external standard. (Additional samples were spiked with different amounts of 100% $H_3PO_4$ and similarly treated, to verify the chemical shift assigned to $H_3PO_4$). The results were as follows:

| Species | Chemical Shift | Relative Peak Areas | Mole Ratios |
|---|---|---|---|
| Tributylphosphate | 0 Hertz | — | — |
| Mono(butoxyethyl) ester of $H_3PO_4$ | +74.5 | 3 | 3 |
| $H_3PO_4$ | +48.1 | 3 | 3 |
| Pyrophosphoric acid | −168.6 | 2 | 1 |

It is not known whether the composition found represents an equilibrium but it at least is evident that the EB/P—O—P reaction is relatively facile and was 60% complete (after about an hour at about 25° C.).

A solution of 700 grams (0.389 equiv.) of DER-667 in 225 grams of EB was heated to 120° C. and 29 grams of a 24.6 wt. % solution of 98% pyrophosphoric acid in EB (0.080 gram atoms P) added dropwise over a 5-minute period, with stirring. The temperature rose slowly to 130° C. 0.5 Hour after the addition was complete, an analytical sample was taken and 15 grams of (distilled) water added. The temperature dropped to 113° C., then slowly rose to 117° C. Heating was continued for two hours, samples being withdrawn after 1 and 2 hours of hydrolysis. The reaction mixture was allowed to cool to room temperature and—by rest (4 hours at 200° C. in air-sweep oven)—contained 75% non-volatiles.

The acid and ester contents of the samples were found (by titration) to be as follows:

| Hours Hydrolysis | Millimoles/gram solids | | | |
|---|---|---|---|---|
| | Free[1] acid | Monoesters | Diester | Triester |
| 0 | $0.98 \times 10^{-2}$ | $2.90 \times 10^{-2}$ | $4.58 \times 10^{-2}$ | $\sim 1.5 \times 10^{-2}$ |
| 1 | 1.45 | 6.89 | 1.49 | ~0.2 |
| 2 | 1.53 | 7.82 | 0.69 | — |

[1]Includes any pyrophosphoric acid present.

$^{31}P$ NMR analysis of the final reaction product (hydrolysate) showed the following composition (phosphorus distribution): free acid, 6.2% monoester of EB, 5.4%; oxirane-derived monoesters, 73.8%; oxirane-derived multi-esters, 14.6%.

In addition to the two isomeric, oxirane-derived monoester peaks, a third peak, about 13 Hz upfield of the more dominant isomer is generally present (but small and poorly defined) in the phosphorus NMR scans of reaction products made according to the present process. This peak in this case was well defined and had a peak area about 1/5 of the area for the less dominant isomer). The addition peak is believed attributable to a cyclic (alkylene) ester which has the structure

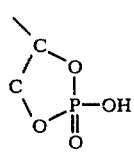

and is an intermediate through which the two isomeric monoesters readily come to an equilibrium (with the alcohol (etc.) or water) in which the ratio of the major to minor isomer is consistently about 3:1.

900 Grams of the hydrolysis mixture was neutralized with 12 grams of DMAE (dimethylaminoethanol) and diluted with 888 grams of water, 63.4 grams of the resulting dispersion (36% non-volatiles by test) was combined with 2.19 grams of CYMEL-303, 4.3 grams of n-hexanol, 4.3 grams of n-butanol and 25 grams more of water.

The resulting coating formulation (0.7/1 solvent to "solids" ratio; 25% non-volatiles) was coated on a tin-free steel panel and cured 2 minutes at 200° C. No blush or loss of adhesion (standard tape-pull test) was observed after the coated panel was boiled in water for 30 minutes.

It is evident from the foregoing results that even when the acid source material includes no higher esters and consists predominantly of free $H_3PO_4$ and the mono EB ester of $H_3PO_4$ (in equivalent amounts), an acceptable coating can be prepared from its reaction products with epoxy resins such as DER-667. It is also apparent that esterification and hydrolysis times of 0.5 and 2 hours, respectively, were adequate (at esterification and hydrolysis temperatures of 130° and 117° C., respectively).

EXAMPLE 9

In-situ formation of acid source material by addition of polyphosphoric acid to hot solution of epoxide in EB (blocking agent and reaction medium).

A solution of 750 grams (0.4167 equiv.) of DER-667 in 225 grams of EB was heated (with stirring) to 110° C. and 6.37 grams of 98% polyphosphoric ("115%") acid (equivalent to 7.179 grams $H_3PO_4$ or 0.073 gram atoms P) was added. The temperature rose rapidly to 132° C. and was maintained at that level for a total phosphorylation time of 0.5 hour. A solution of 15 grams of water in 10 grams of EB was added and the temperature dropped to 122° C. 0.25 Hour later, an analytical sample (15 minutes hydrolysis time) was taken. The hydrolysis was continued at ~119° C. for another 2 hours, additional samples being taken at 1 and 2 hours and the reaction mixture allowed to cool. By test, the non-volatiles content of the hydrolysis mixture was 77%. The acid and ester contents (by titration) were:

| Hydrolysis Time | Millimoles/gram solids | | | |
|---|---|---|---|---|
| | Free acid | Monoesters | Diester | Triester |
| 0.25 hr. | $0.60 \times 10^{-2}$ | $3.02 \times 10^{-2}$ | $3.34 \times 10^{-2}$ | $2.80 \times 10^{-2}$ |
| 1.25 | 0.99 | 5.97 | 1.58 | 1.30 |
| 2.25 | 1.12 | 7.10 | 0.78 | 0.79 |

On comparison with Example 8, it will be seen that the free acid content was substantially lower in the product derived from polyphosphoric acid than in that derived from pyrophosphoric acid but the extent of conversion of polyesters to monoesters was somewhat lower, despite a somewhat more prolonged hydrolysis at a slightly higher temperature.

Further hydrolysis would increase the mono- to polyesters ratio, without excessively raising the free acid level. However, the foregoing end product is considered quite satisfactory—as is—for coating (and other) applications.

EXAMPLE 10

In-situ preparation of acid source material by addition of $P_4O_{10}$ to hot solution of epoxide in EB (blocking agent/reaction medium).

5.50 Grams (0.0190 moles) of 98% $P_4O_{10}$ (0.076 gram atoms P) was weighed out, in a dry atmosphere, into a flask which was then stoppered. Most of the flask contents was rapidly added—with stirring—to a hot (100° C.) solution of 750 grams (0.4167 equiv.) of DER-667 in 225 grams of EB. The rest of the $P_4O_{10}$ was rinsed into the resulting mixture with 25 grams more of EB. After the phosphorylation had been in progress for 1 hour, lumps of undissolved solid (presumably ester-coated $P_4O_{10}$) was still present but 15 grams of distilled water were added and the hydrolysis allowed to proceed (at 118° C.) for 2 hours. By test, the non-volatiles content of the hydrolysis mixture at this point was 75.6%. Titration of a sample of the mixture gave the following results:

| | | |
|---|---|---|
| Free acid | $1.53 \times 10^{-2}$ | m moles/g solids |
| Monoesters | 6.62 | |
| Diester | 1.00 | |
| Triester | 0.85 | |

Again, a relatively high free acid content and low monoester content were experienced. However, this result was attributed to the presence of a substantial proportion of unconverted $P_4O_{10}$ when hydrolysis was commenced; it will be noted that the di- and triester contents were no higher than in Example 9.

Polyphosphoric acid is less expensive than pyrophosphoric acid and is more practical to use than $P_4O_{10}$. Assuming a little more time for hydrolysis of the phosphorylation mixture is allowed, it is evident that just as good a product can be obtained with the poly ("115%") acid as with the pyro ("110%") acid.

EXAMPLE 11

"Super" (105%) phosphoric acid/EB reaction product as acid source material. EB as reaction medium.

To a hot (100° C.) solution of 1200 grams (0.6857 equiv.) of DER-667 (EEW 1750) in 260 grams of EB was added (all at once) a solution of 10.57 grams of super phosphoric acid (0.1133 gram atomp P) in 50 grams of EB. The temperature rose to 120° C. The resulting mixture was stirred and heated at 120° C. until (1-2 hours) the EEW of the mixture exceeded 70,000, then 24 grams of water was added and hydrolysis allowed to proceed for 2 hours at reflux (125°-130° C.). An analytical sample was taken. The reaction mixture was then cooled to 100° C. and neutralized by addition of 14.4 grams DMAE in admixture with 48 grams of n-butanol. The resulting solution was stirred 0.5 hour at 90° C. and 2 liters of water then added over a 1.5 hour period while holding the temperature at about 80° C. The resulting dispersion contained 34% non-volatiles, had an average particle size of 2000 Angstroms and had excellent film properties.

The acid and ester contents in the sample of the hydrolysis mixture were:

| | | |
|---|---|---|
| Free acid | $1.22 \times 10^{-2}$ | m moles/g solids |
| Monoesters | 6.68 | |
| Diester | 0.85 | |
| Triester | 1.25 | |

EXAMPLE 12

Presently most preferred mode of practicing invention. Direct addition of polyphosphoric acid to EB solution of epoxy resin. Phosphorylation and hydrolysis both at 125° C.

A solution of 100 parts by weight of the resin (DER-667, EEW 1800, for example) in 35 phr of EB is heated to about 105° C. and 0.8 phr of polyphosphoric (115%) acid is added (with stirring) and the temperature allowed to rise to and maintained at 125°±1° C. for 30 minutes. 2 phr of water is then added and hydrolysis allowed to proceed, under reflux, at the same temperature for 2 hours. 17.5 phr of 1-butanol is added, the resulting solution is cooled to 80°±2° C. and 1.2 phr of DMAE added. 129.21 phr of water is added, over a 30 minute period (with stirring); the resulting aqueous dispersion contains 35% by weight of the resin and the non-volatiles content—including the resin, the reacted-in acid (as $H_3PO_4$) and residual (reacted-in and associated) EB—is $1.03 \times 35 = 36.05\%$.

The acid and ester contents after 2 hours hydrolysis time are within the following specifications:

| | | |
|---|---|---|
| Free acid[1] | $\leq 1.2 \times 10^{-2}$ | millimoles per gram resin |
| Monoester | $>5.5 \times 10^{-2}$ | |
| Diester | $<2.0 \times 10^{-2}$ | |
| Triester | $<7.0 \times 10^{-3}$ | |

[1]Species indistinguishable from $H_3PO_4$ by titration.*
*Includes any phosphomonesters having sufficient water solubility to report in the aqueous extract of the analytical sample, such as monoesters of EB, which partition between the organic and aqueous phases. Results in somewhat high free acid and low monoester numbers.

For spray application the dispersion is formulated as follows:

| Component | % by weight |
|---|---|
| Dispersion | 60.84 |
| Additional EB | 2.65 |
| Additional n-butanol | 1.33 |
| n-Hexanol | 4.84 |
| Additional DMAE | 0.16 |
| CYMEL-303 | 1.92 |
| Additional water | 28.26 |

This formulation is the subject of a pending (allowed) application, Ser. No. 200,223, filed Oct. 23, 1980, in the names of P. A. Lucas and D. R. Perine as inventors now U.S. Pat. No. 4,316,922.

Generally equivalent results are obtained when the foregoing phosphorylation is carried out at 145° C. (hydrolysis initiated after 20 minutes and carried out at 122° C.) or at 115° (hydrolysis initiated after 1 hour and carried out at 122° C.).

EXAMPLE 13

Effect of prolonged phosphorylation and hydrolysis times.

The phosphorylation procedure of Example 12 was followed, except that hydrolysis was not initiated until the reaction had been in progress for 4.5 hours and the hydrolysis was continued for 4 hours. The acid and ester contents of the reaction mixture varied as follows:

| Hours Since Phosphorylation | Millimoles per gram of resin | | | |
|---|---|---|---|---|
| Initiated | Free acid | Monoesters | Diesters | Triesters |
| 0.5 | $0.59 \times 10^{-2}$ | $2.24 \times 10^{-2}$ | $2.89 \times 10^{-2}$ | $3.60 \times 10^{-2}$ |
| 1.5 | 0.68 | 2.92 | 3.43 | 2.36 |
| 3.0 | 0.76 | 2.86 | 3.66 | 2.11 |
| 4.5[1] | 0.81 | 2.63 | 3.78 | 2.17 |
| 5.0 | 1.12 | 3.43 | 2.60[2] | 2.20 |
| 6.0 | 1.16 | 4.95 | 1.05 | 2.23 |
| 7.0 | 1.43 | 5.10 | 1.00 | 1.86 |
| 8.5 | 1.63 | 4.93 | 1.07 | 1.76 |

[1]Hydrolysis initiated.
[2]Corrected, by curve fitting, from actual titration result (2.00).

It is evident from the foregoing results that the monoester content attainable—even by prolonged hydrolysis—is definitely suppressed if the phosphorylation is allowed to continue (at 125° C.) for several hours before the hydrolysis is initiated. However, if the hydrolysis time is extended an additional half hour (2.5 hours total), the resulting monoester content will still be close to the acceptable minimum for water-resistant coatings applications and the free acid content, although undesirably high, will be acceptable.

A similar experiment, carried out at 145° C. (phosphorylation only) showed the usual rise in diester content during the first hour but thereafter (reaction terminated after total of 2.5 hours) the diester content fell (the free acid and monoester contents remaining essentially level). It thus appears that at 145° C., the diester P—OH (which is more strongly acid than $H_3PO_4$) will react with the EB and the equilibrium between the resulting triester and the water evolved by the reaction favors the triester. Accordingly, extension of the "normal" phosphorylation time by a couple of hours would appear to be less deleterious at 145° than at 125° C.

EXAMPLE 14

Comparison of other reaction media with EB.

A series of six runs was made with different solvents or solvent mixtures as the reaction medium in the procedure of Example 12 (except that super phosphoric acid or a pre-formed EB/polyphosphoric acid reaction product was used as the acid source material. These runs are summarized in the table following:

| Run # | Acid Source Material | Reaction Medium | Initial % Solids | Millimoles/gram of resin | | | |
|---|---|---|---|---|---|---|---|
| | | | | Free acid | Monoester | Diester | Triester |
| 1 | PP/EB[1] | EB | 74[2] | $1.15 \times 10^{-2}$ | $6.53 \times 10^{-2}$ | $0.72 \times 10^{-2}$ | $0.98 \times 10^{-2}$ |
| 2 | PP/EB[1] | EB 85%[2] n-butanol 15%[3] | 66 | 1.13 | 4.91 | 1.30 | 2.04 |
| | | (After 3 hrs. hydrolysis; | | 1.17 | 5.50 | 1.07 | 1.64) |
| 3 | Super-acid[4] | EB 40% n-butanol 60% | 80.5 | 0.84 | 5.80 | 2.63 | 0.73 |
| 4 | | DB[5] | 74.1 | 0.52 | 6.80 | 1.31 | 1.37 |
| 5 | | PiBT 40% n-butanol 60% | 72.6 | 1.00 | 5.13 | 3.60 | 0.24 |
| 6 | | Cyclohexanone 50% n-butanol 50% | 70.0 | 0.42 | 5.20 | 1.58 | 2.80 |

Notes:
[1]35 grams polyphosphoric acid per 100 grams EB.
[2]Percents by weight.
[3]Hydrolysis at 118° C.
[4]Super (105%) phosphoric acid - added as such to resin solution.
[5]Mono n-butyl ether of diethylene glycol.

It will be seen that free acid levels acceptable for water-resistant coatings applications were attained in each run but that, except for DB and 40:60 EB/butanol, reaction media other than EB resulted in undesirably low monoester contents. The highest monoester/free acid ratio resulted when DB was used as the reaction medium.

EXAMPLE 15

Use of non-hydroxylic (but hydrophilic) solvent (cyclohexanone) as reaction medium.

A reaction product of 4 gram moles of DOWANOL-EB per gram mole of "$P_2O_5$" was prepared by stirring a mixture of 283.2 grams of EB and 85.2 grams of $P_2O_5$, at a temperature below 50° C., in a bath-cooled, 3-necked, round-bottom flask, until the mixture was a water white, viscous solution.

To a pre-formed solution of 200 grams (111.111 m. equiv.) of DER-667 (EEW 1800) "in" 133.3 grams of cyclohexanone was added, with stirring, 6.26 grams of the $P_2O_5$/EB solution (equivalent to 20.3918 m. moles or 0.9992 phr of $H_3PO_4$). The resultant solution was heated to 125° C. and held 0.5 hour at that temperature. 30.34 Grams of xylene were then stirred into the reaction (phosphorylation) mixture. Five grams of water was added and the mixture stirred at 113° C. for a total of 4.5 hours, with analytical samples being removed after 0.25, 1.50, 3 and 4.5 hours of hydrolysis time. (The percent "non-" volatiles prior to xylene addition was $206.26 \times 100/339.56 = 60.7433\%$). The analytical results follow:

| Hydrolysis Time, hours | Millimoles Per Gram of Resin | | | | |
|---|---|---|---|---|---|
| | Free $H_3PO_4$ | Mono-Ester | Diesters | Triesters | Total |
| 0.25 | 0.23 | 4.04 | 2.13 | 3.8 | 10.20 |
| 1.50 | 0.42 | 8.59 | 0.56 | 0.63 | 10.20 |
| 3.00 | 0.46 | 9.28 | 0 | 0.46 | 10.20 |
| 4.50 | 0.49 | 9.87 | 0 | 0 | 10.36 |

The proportion of the total phosphorus finally recovered as monoester was $9.87 \times 100/10.36 = 95.27\%$. Since all higher esters were hydrolyzed, the percent of oxirane actually converted to monoester can be taken (assuming no EB ester groups remained) as $0.9527 \times 18.353$ (maximum possible oxirane to monoester conversion) $= 17.4859\%$. This corresponds to a 1,2-glycol to betahydroxy monoester group ratio of $(100-17.4859)/17.4859 = 4.72:1$.

The greater than 95% conversion of $P_2O_5$ phosphomono-ester experienced in the foregoing experiment is the highest achieved by the method of either the present application or U.S. Pat. No. 4,289,812.

The hydrolysis mixture was neutralized with dimethylaminoethanol (2 moles per mole "H₃PO₄" charged (as P₂O₅/EB product)) and diluted with water to provide an aqueous dispersion having a total "solids" content of 31 wt. %. Coatings resistant to boiling water and to organic solvents (acetone) were obtained by drawing films on tin-free steel coupons from the dispersion (including CYMEL-303; 20% in H₂O, as a curing agent) and curing them.

What is claimed is:

1. In the process of preparing aqueous coating compositions wherein a polyol, polyether epoxide is reacted with a phosphoric acid source material and water in a reaction medium, the reaction mixture is salified with a base and diluted with water and the reaction medium removed from it, the improvement comprising:
   (1) employing as said acid source material one deriveable by the reaction of a hydroxylic (P—OH)-blocking agent with (a), P₄O₁₀, (b), a reaction product of P₄O₁₀ with less than six molecular proportions of water or (c), an adduct of (b) with some of the oxirane groups in said epoxide,
   (2) employing as said medium a hydrophilic solvent for said epoxide which is acceptable as a component of said coating composition,
   (3) phosphorylating said epoxide by reacting P—OH groups in the acid source material—effectively in the absence of free water molecules—with oxirane groups in said epoxide until the content in the reaction mixture of species indistinguishable from H₃PO₄ by titration drops to a preselected level and then
   (4) subjecting the resultant reaction product to hydrolysis until the content in the reaction mixture of oxirane-derived phosphomonoester groups rises to a preselected value, and
   (5) omitting removal of the reaction medium.

2. The process of claim 1 in which said preselected level is the minimum attainable level and said preselected value is the maximum attainable value.

3. The process of claim 1 in which said epoxide can be represented by either of the following formulas I and II:

$$CH_2\overset{O}{\underset{R^1}{\overset{\diagup\diagdown}{C}}}-CH_2-O-\left[Q-O-CH_2-\underset{R^1}{\overset{OH}{\underset{|}{C}}}-CH_2-O\right]_n-Q-O-CH_2-\overset{O}{\underset{R^1}{\overset{\diagup\diagdown}{C}}}-CH_2 \text{ or} \quad (I)$$

$$R^5-\underset{}{\overset{R_r^2}{\bigcirc}}-O-CH_2-\underset{R^1}{\overset{OH}{\underset{|}{C}}}-CH_2-O-\left[Q-O-CH_2-\underset{R^1}{\overset{OH}{\underset{|}{C}}}-CH_2-O\right]_n-Q-O-CH_2-\overset{O}{\underset{R^1}{\overset{\diagup\diagdown}{C}}}-CH_2, \quad (II)$$

wherein

Q, independently, in each occurrence, is $$\underset{}{\overset{R_r^2}{\bigcirc}}-R^3-\underset{}{\overset{R_r^2}{\bigcirc}} \text{ or } \underset{}{\overset{R^4}{\bigcirc}},$$

n is an integer of from 0 to 40, r is zero, 1 or 2 and, independently in each occurrence;
R¹ is H, methyl or ethyl, R² is —Br, —Cl or a C₁ to C₄ alkyl or alkenyl group,
R³ is a C₁-C₄ alkylene or alkenylene group, >C(CF₃)₂, —CO—, —SO₂—, —S—, —O— or a valence bond,
R⁴ is —Br, —Cl or a C₁ to C₄ alkyl or alkenyl group; and
R⁵ is H or alkyl of 1 to 12 carbons
and the amount of said acid source material employed is such as to provide from about 0.1 to about 0.2 gram atoms of phosphorus per gram equivalent weight of oxirane provided by said epoxide.

4. The process of claim 3 wherein the epoxide is of formula I and n is from about 12 to 14 and Q is a bisphenol A residue.

5. The process of claim 1 wherein the blocking agent is phenol, n-butanol or a 2-alkoxyethanol which (1) is capable of reacting with P—O—P groups in said acid source material to form phosphoester groups more readily hydrolyzed than the monoester groups deriveable from the reaction of the oxirane groups in said epoxide with the P—OH groups in the acid source material, and (2) is acceptable as a component of said coating composition.

6. The process of claim 5 wherein said blocking agent is 2-n-butoxyethanol.

7. The process of claim 1 wherein the blocking agent and the reaction medium are the same.

8. The process of claim 7 in which said agent and medium are both 2-n-butoxyethanol.

9. The process of claim 1 in which said acid source material is pre-formed in the absence of said epoxide.

10. The process of claim 1 in which said acid source material is formed in-situ by the introduction of P₄O₁₀, or a reaction product thereof with less than six molecular proportions of water, to a solution of said epoxide comprising said blocking agent.

11. The process of claim 1 wherein said acid source material is a reaction product of said blocking agent with super, pyro- or polyphosphoric acid.

12. The process of claim 10 in which said reaction product with water is polyphosphoric acid.

13. The process of claim 4 in which R¹ is H, and said acid source material is formed in-situ by reaction of polyphosphoric with 2-n-butoxyethanol comprised in a solution of said epoxide in said reaction medium.

14. The process of claim 13 in which said reaction medium is 2-n-butoxyethanol.

15. The process of claim 14 wherein said phosphorylation is carried out over a period of from about 15 minutes to about 60 minutes at a temperature of from about 145° to about 100° C. and said hydrolysis is carried out over a period of from about 1 hour to about 6 hours at a temperature of from about 130° to about 100°.

16. The process of claim 15 in which the phosphorylation and hydrolysis are both carried out at about the same temperature, which is within the range of from about 124° to about 126° C., for respective periods of about 0.5 and about two hours.

17. The process of claim 16 in which said epoxide has an epoxide equivalent weight of about 1800, the weight of said polyphosphoric acid is about 0.8% of the weight of the epoxide and the amount of water added to initiate hydrolysis is from about 1 to about 2% of the weight of said epoxide.

18. The process of claim 17 in which said base is dimethylaminoethanol.

19. The process of claim 1 in which said epoxide constitutes from about 60 to about 85 weight percent of the phosphorylation mixture.

20. The process of claim 18 in which said epoxide constitutes from about 72 to about 76 weight percent of the phosphorylation mixture.

21. The process of claim 1 wherein said reaction medium is cyclohexanone.

22. The process of claim 21 wherein said blocking agent is 2-n-butoxyethanol.

* * * * *

UNITED STATES PATENT AND TRADEMARK OFFICE
CERTIFICATE OF CORRECTION

PATENT NO. : 4,397,970
DATED : August 9, 1983
INVENTOR(S) : Kent D. Campbell, Horst G. Langer, Patrick H. Martin It is certified that error appears in the above—identified patent and that said Letters Patent is hereby corrected as shown below:

Column 1, line 68, a space should be left between "20" and "in";

Column 2, line 24, delete "ot" and insert -- of --;

Column 3, line 8, delete "P=O" and insert -- $\stackrel{-}{\raise.3ex-}$P=O --;

Column 7, line 68, delete "of" before the word "each";

Column 8, at lines 30 and 40, the first part of the formula should read:

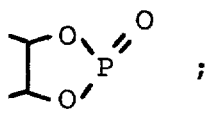

Column 9, line 15, the first four letters should read -- tion --; rather than "tin";

Column 10, line 66, the first five letters should read -- tents --, rather than "tent";

UNITED STATES PATENT AND TRADEMARK OFFICE
CERTIFICATE OF CORRECTION

PATENT NO. : 4,397,970

DATED : August 9, 1983

INVENTOR(S) : Kent D. Campbell, Horst G. Langer, Patrick H. Martin

It is certified that error appears in the above—identified patent and that said Letters Patent is hereby corrected as shown below:

Column 11, line 66, insert -- a -- before "pre-formed";

Column 12, line 27, insert -- the -- before "acid";

Column 13, line 53, delete "addition" and insert -- adduction --;

Column 14, line 15, "epoxides" should be singular;

Column 17, line 10, after "at" insert -- a --;

Column 17, line 34, delete "Further" and insert -- Fourier --;

Column 19, line 41, delete "less" and insert -- loss --;

Column 20, line 30, delete "20OH" and insert -- 2∅OH --;

Column 20, line 66, "triethylamine" has been misspelled;

UNITED STATES PATENT AND TRADEMARK OFFICE
CERTIFICATE OF CORRECTION

PATENT NO. : 4,397,970  
DATED : August 9, 1983  
INVENTOR(S) : Kent D. Campbell, Horst G. Langer, Patrick H. Martin It is certified that error appears in the above—identified patent and that said Letters Patent is hereby corrected as shown below:

Column 21, line 23, delete "of" and insert -- or --;

Column 23, line 25, delete "ED" and insert -- EB --;

Column 24, line 12, "hours" should be singular;

Column 25, line 1, insert -- ; -- after "30%";

Column 25, line 4, "foregoing" has been misspelled;

Column 25, line 6, delete "$H_2PO_4$" and insert -- $H_3PO_4$ --;

Column 27, line 30, delete "rest" and insert -- test --;

Column 27, line 47, insert -- ; -- after "6.2%";

Column 27, line 57, delete "addition" and insert -- additional --.

Signed and Sealed this

Third Day of April 1984

[SEAL]

Attest:

GERALD J. MOSSINGHOFF

Attesting Officer  
Commissioner of Patents and Trademarks